United States Patent
Martin et al.

(10) Patent No.: US 7,033,431 B2
(45) Date of Patent: Apr. 25, 2006

(54) SURFACTANT COMPOSITION FOR GYPSUM PLASTER BOARDS

(75) Inventors: Daniel Martin, Lyons (FR); Robert Garcin, L'lsle d'Abeau (FR); Serge Sabio, Saint Just Chaleyssin (FR)

(73) Assignee: Lafarge Platres, Avignon (FR)

( * ) Notice: Subject to any disclaimer, the term of this patent is extended or adjusted under 35 U.S.C. 154(b) by 0 days.

(21) Appl. No.: 10/381,232

(22) PCT Filed: Sep. 14, 2001

(86) PCT No.: PCT/FR01/02866

§ 371 (c)(1),
(2), (4) Date: Jun. 9, 2003

(87) PCT Pub. No.: WO02/24595

PCT Pub. Date: Mar. 28, 2002

(65) Prior Publication Data

US 2003/0188670 A1 Oct. 9, 2003

(30) Foreign Application Priority Data

Sep. 22, 2000 (FR) .................................. 00 12091

(51) Int. Cl.
*C04B 24/16* (2006.01)
*C04B 28/14* (2006.01)
*C04B 11/00* (2006.01)
*B32B 13/00* (2006.01)
*B32B 13/04* (2006.01)

(52) U.S. Cl. ...................... 106/781; 106/678; 106/680; 106/778; 106/783; 156/39; 427/372.2; 428/703

(58) Field of Classification Search ................ 106/778, 106/781, 678, 680, 783; 156/39; 427/372.2; 428/703

See application file for complete search history.

(56) References Cited

U.S. PATENT DOCUMENTS

| | | |
|---|---|---|
| 5,158,612 A | 10/1992 | Savoly et al. |
| 5,240,639 A | 8/1993 | Diez et al. |
| 5,643,510 A | 7/1997 | Sucech |

FOREIGN PATENT DOCUMENTS

| | | |
|---|---|---|
| RU | 967996 | 10/1982 |
| RU | 1252322 | 8/1986 |
| WO | 95/16515 | 6/1995 |
| WO | 99/08978 | 2/1999 |
| WO | 00/06518 | 2/2000 |

*Primary Examiner*—Anthony J. Green
(74) *Attorney, Agent, or Firm*—Buchanan Ingersoll PC

(57) ABSTRACT

A gypsum composition including gypsum, water, and a surfactant composition of alkyl sulfates of formula $H(CH_2)_nOSO_3^-M^+$, in which n is from 6 to 16, the mean number of carbon atoms in the alkyl sulfate composition $n_m$ being between 10 and 11, and M is a monovalent cation. A process for the preparation of the gypsum composition and a gypsum board obtainable from this composition. Finally, a process for the manufacture of gypsum boards. Application for the manufacture of foamed gypsum boards.

72 Claims, 1 Drawing Sheet

SURFACTANT COMPOSITION FOR GYPSUM PLASTER BOARDS

The present invention relates to a gypsum composition comprising a surfactant composition, in particular for the manufacture of foamed gypsum boards, and to a process for the manufacture of gypsum boards employing a surfactant composition and to the foamed gypsum boards thus manufactured.

A gypsum board is a prefabricated parallelepipedal component made of set gypsum (calcium sulfate dihydrate) covered with cardboard or paper or inorganic fibres on each of its faces. The composite thus formed exhibits good mechanical properties, the sheets on the faces acting both as support and as facing.

The gypsum core is obtained from a gypsum slurry essentially formed by mixing hydratable calcium sulfate and water, if appropriate with the addition of conventional admixtures. The term "hydratable calcium sulfate" should be understood as meaning, in the present account, anhydrous calcium sulfate (anhydrite II or III) or a calcium sulfate hemihydrate ($CaSO_4 \cdot \frac{1}{2}H_2O$) in its α or β crystalline form. Such compounds are well known to a person skilled in the art and are generally obtained by the calcination of a gypsum.

The slurry rapidly sets by hydration of the calcined gypsum. The boards are subsequently heated in dryers in order to remove the excess water.

The lightening of gypsum boards, in addition to their mechanical strength, represents a fundamental issue. In order to lighten the gypsum board, it is commonplace to introduce air into the slurry by adding a foam to the gypsum slurry.

The foam is generally formed by introducing air into an aqueous surfactant solution by means of an appropriate device.

With the aim of improving existing gypsum boards, and in particular of obtaining gypsum boards with a lower density exhibiting good mechanical strength, a number of studies have been carried out to optimize the surfactant used with regard to the density of the gypsum board obtained.

The reduction of the density of the gypsum boards is desired for its two-fold economic advantage: first, it makes it possible to lighten the product and thus to facilitate its transportation and, secondly, it makes it possible to overcome the limitation on the production throughput by the reduction in the demand for gypsum. This is because the calcination of the gypsum takes time and it is possible for this stage to be a limiting step on the speed of the production line. The decrease in the demand for gypsum makes it possible in addition to reduce the production costs related to the calcination. Thus, the reduction of the density of the gypsum boards makes it possible to decrease the transportation costs, to increase the line speed and, at the same time, to decrease the production costs.

Surfactant compositions for lightening gypsum boards are known. Thus, a surfactant composition based on alkyl sulfates and alkyl ether sulfates is disclosed in WO 9516515. In this composition, the ratio of alkyl sulfates to alkyl di- or triether sulfates is at least 12:1, preferably between 30:1 and 60:1.

It is indicated in this document that alkyl sulfates alone are undesirable.

In addition, the document WO 9009495 teaches that large bubbles with a substantially spherical shape promote good mechanical strength of the gypsum boards, provided that these bubbles are "discrete", namely isolated and intact, and that they are preferably distributed evenly in the core of the gypsum board. This type of distribution of bubbles is obtained with a surfactant comprising an alkyl ether sulfate salt corresponding to the formula:

$$CH_3(CH_2)_xCH_2-(OCH_2CH_2)_y-OSO_3M$$

in which at least 90% of x is between 6 and 8 and the mean value of y is between 0.4 and 1.3, M being a cation which forms a water-soluble surfactant. Such a surfactant with a degree of alkoxylation of less than 1 corresponds to a mixture of ethoxylated alkyl sulfate (alkyl ether sulfate) and of nonethoxylated alkyl sulfate. Thus, the composition comprises between 44 and 85% by weight of alkyl sulfate (y=0).

However, it turned out that such a structure with evenly distributed large air bubbles is not always obtained with this type of surfactant composition.

U.S. Pat. No. 5,643,510 discloses a surfactant composition comprising a mixture of alkyl sulfates and alkyl ether sulfates which makes it possible to control the size of the bubbles. In addition, the document teaches that alkyl sulfates, which form unstable foams, are not used because of their consumption, which is 7.32 $g/m^2$, which is an excessive consumption with respect to the consumption of a foaming agent comprising an alkyl sulfate and an alkyl ether sulfate, which is of the order of 0.98 to 2.92 $g/m^2$ (0.2–0.6 pound/1000 sq. ft). The use of an alkyl sulfate alone is described as resulting in a significant excess consumption of surfactant.

However, it is preferable in terms of cost to use an alkyl sulfate instead of an alkyl ether sulfate as surfactant. This is because, whereas the alkyl sulfate can be obtained by direct sulfatation of the corresponding fatty alcohol, it is necessary to first perform an ethoxylation stage to obtain the alkyl ether sulfate. This stage is not only expensive but can additionally result in the formation of undesirable byproducts.

However, until now, alkyl sulfates could only be employed as a mixture with alkyl ether sulfates, as their foaming power is inadequate. It turns out that a considerably higher dosage is needed in order to achieve the desired foam volume, which results in a considerable additional cost.

The problem which the invention intends to solve thus consists in providing an inexpensive surfactant which is easily prepared from commercially available products and which exhibits a strong foaming power.

The quality of the surfactant is evaluated with respect to the volume of foam formed but also with respect to its stability once it is introduced into the gypsum slurry.

The robustness of the surfactant with respect to the various foam generation processes used also constitutes a desired property.

Another problem encountered relates to the transferability of a surfactant solution. This is because it is often the case that a surfactant gives highly satisfactory results on one type of gypsum but nevertheless proves to be disappointing on another site using a different type of gypsum. It is therefore advantageous to have available a surfactant solution which makes it possible to obtain comparable results for various types of gypsum.

Finally, the gypsum board must, even lightened, exhibit excellent mechanical characteristics.

A subject-matter of the invention is therefore a gypsum composition comprising a surfactant composition which solves these problems. A surfactant composition, whether a binary composition or a ternary composition, also forms the subject-matter of the invention.

The subject-matter of the present invention is thus a gypsum composition comprising, in combination with gypsum and water, a surfactant composition comprising alkyl sulfates of formula $H(CH_2)_nOSO_3^-M^+$, in which n is from 6 to 16, the mean number of carbon atoms in the alkyl sulfate composition $n_m$ being between 10 and 11, and M is a monovalent cation.

The term "$n_m$", the mean number of carbon atoms in the composition, is understood to mean the sum of the n values of the alkyl sulfates weighted by their concentration by weight in the surfactant composition. According to one embodiment, $n_m$ is between 10.1 and 10.7.

The number of carbon atoms n in the surfactant composition which is particularly preferred is from 6 to 14.

According to one embodiment, the surfactant composition comprises three alkyl sulfates.

The surfactant composition preferably comprises 40 to 90% by weight of decyl sulfate. In addition, the surfactant composition preferably comprises 0 to 30%, preferably 1 to 25%, by weight of octyl sulfate. Finally, the surfactant composition preferably comprises 10 to 50% by weight of dodecyl sulfate.

According to one advantageous embodiment, the monovalent cation M is chosen from sodium and ammonium.

A particularly advantageous surfactant composition according to the invention comprises 55 to 75% by weight of sodium decyl sulfate, 0 to 15% by weight of sodium octyl sulfate and 18 to 37% by weight of sodium dodecyl sulfate.

Furthermore, the surfactant composition can additionally comprise a sequestering agent and/or a hydrotropic agent.

Another subject-matter of the invention is a process for the manufacture of a gypsum composition according to the invention, comprising the stages of:

preparing a gypsum slurry from gypsum and water;

forming a foam from a surfactant composition comprising alkyl sulfates of formula $H(CH_2)_nOSO_3^-M^+$, in which n is a number between 6 and 16, the mean number of carbon atoms in the alkyl sulfate composition $n_m$ being between 10 and 11, and M is a monovalent cation, and water; and mixing the gypsum slurry and the surfactant foam.

Another subject-matter of the invention is a gypsum board obtainable from such a gypsum composition.

Finally, a last subject-matter of the invention relates to a process for the manufacture of gypsum boards, comprising the stages of:

preparing a gypsum slurry from gypsum and water;

forming a foam from a surfactant composition comprising alkyl sulfates of formula $H(CH_2)_nOSO_3^-M^+$, in which n is a number between 6 and 16, the mean number of carbon atoms in the alkyl sulfate composition $n_m$ being between 10 and 11, and M is a monovalent cation, and water; and mixing the gypsum slurry and the surfactant foam;

pouring the gypsum composition between two layers of external material;

drying the gypsum board.

According to a preferred embodiment, the gypsum composition is defined as set out above.

BRIEF DESCRIPTION OF THE DRAWINGS

Other characteristics and advantages of the invention will be described in detail hereafter, with reference to the figures, in which.

DETAILED DESCRIPTION OF THE PREFERRED EMBODIMENTS

A subject-matter of the invention is thus a gypsum composition comprising a surfactant composition based on alkyl sulfates which makes it possible to manufacture foamed gypsum boards exhibiting good mechanical strength.

The gypsum composition according to the invention comprises gypsum, water and a surfactant composition. Moreover, it can comprise other additives as generally used.

Figure 1:
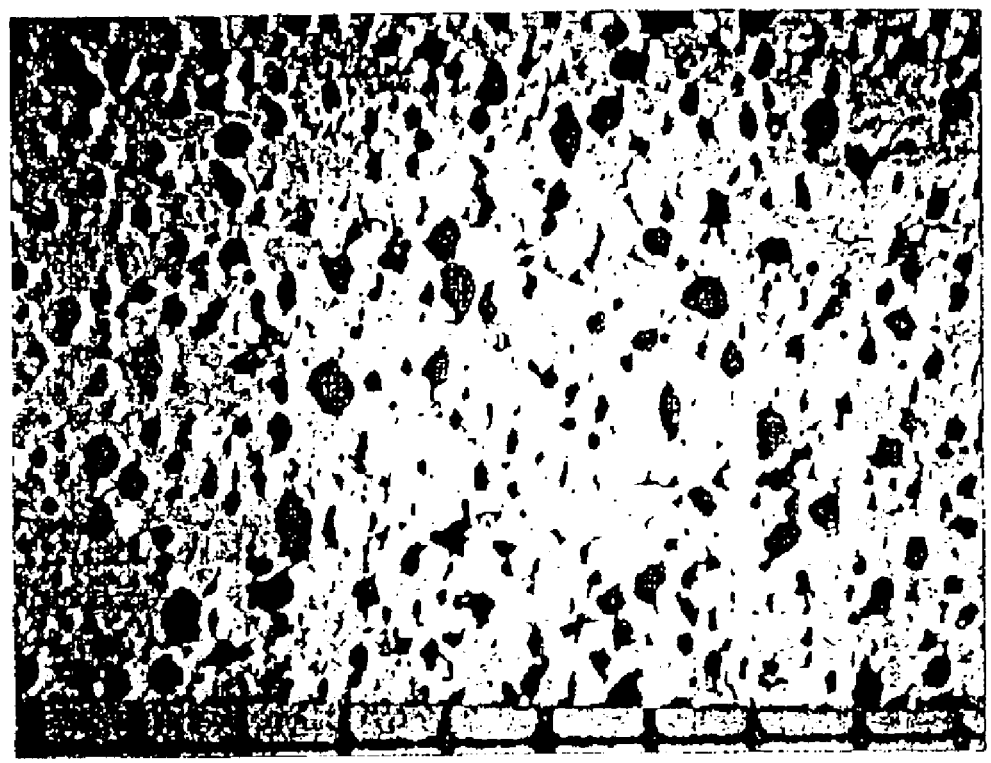
FIG. 1 represents a photograph of the microstructure of a gypsum board obtained with a surfactant composition according to the invention.
Figure 2:
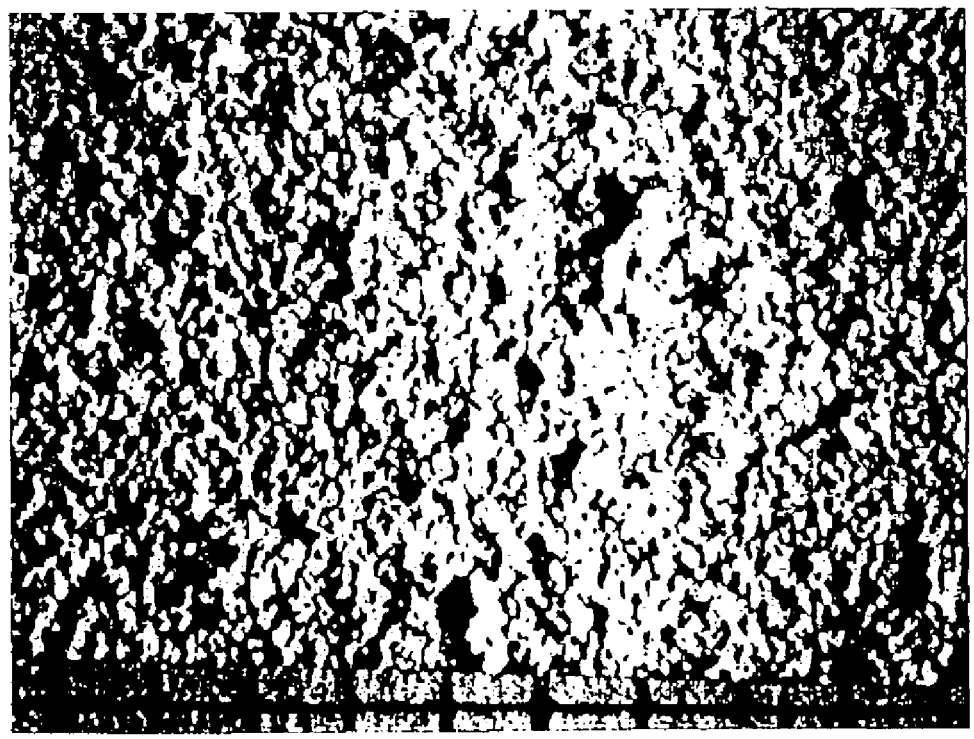
FIG. 2 represents a photograph of the microstructure of a gypsum board obtained with a comparative surfactant composition.

As shown in FIGS. 1 and 2, the structure of a foamed gypsum board as observed over the section is distinctly different between a board obtained with a conventional surfactant (F1919 available from Cognis) and with a composition according to the invention (Example 1). It is observed that the conventional gypsum boards exhibit a structure characterized by the presence of small bubbles. In contrast, a gypsum board obtained with a gypsum composition comprising a surfactant according to the invention exhibits larger, isolated and intact bubbles. Different properties are a consequence of the structural difference in the gypsum boards.

In fact, it has been discovered that some alkyl sulfate compositions which are a subject-matter of the invention do not exhibit the disadvantages for reason of which alkyl sulfates are not used as surfactants for the manufacture of gypsum boards. On the one hand, they exhibit a very high foaming power and thus do not result in the excess consumption of surfactant. On the other hand, such compositions make it possible to obtain stable foams which are compatible with the gypsum slurry. Thus, the introduction of these foams into the gypsum slurry makes it possible to obtain foamed gypsum boards having good mechanical properties.

In addition, such a surfactant composition is robust. The term "robust" is understood to mean, in the present account, the fact that a surfactant composition is capable of forming a given amount of foam by means of different foam generation methods. Such foam generation methods are, for example, the Waring Blender, by which a foam is formed by high speed stirring of crosswise and sharpened blades, the Hamilton Beach, in which stirring is carried out using a slightly notched turbine, or the Ultraturax, with a turbine equipped with knives turning at high speed (rotor) and with side slots (stator). This robustness is reencountered in industrial foam generation processes (in-series centrifugal pumps, Babcock-BSH static generators, and the like).

Furthermore, the foam formed by the surfactant composition according to the invention makes it possible to obtain comparable reductions in weight for gypsum boards prepared with different types of gypsum. Thus, the surfactant composition is advantageous in that it is relatively insensitive to the quality of gypsum employed.

Furthermore, the characteristics of the foam formed by the surfactant composition are relatively insensitive to temperature. Thus, when the temperature of the water varies, the foam volume generated remains substantially constant.

Another advantageous characteristic of the surfactant composition according to the invention is the constancy of the density of the gypsum board obtained. This is because it has been observed that the use of an alkyl sulfate alone results in gypsum boards with a highly variable density. The gypsum composition comprising a surfactant composition according to the invention for its part results in gypsum boards with a constant density. The term "constant density" is understood to mean a density which does not vary within the board and between boards of the same batch by more than 3%, preferably 2%. In addition, it turned out that the quality of bonding between the gypsum and the external sheet of the gypsum boards according to the invention is outstanding.

The gypsum boards obtained with the composition according to the invention have excellent mechanical qualities. The mechanical strength of gypsum boards is usually evaluated by the flexural strength of their cores, the hardness of the core, the ballprint and the final strength of the gypsum board. The resistance which the gypsum board makes to a quarter-inch nail head being driven in, also called the "nail pull resistance", as described in ASTM Standard C473-Method B, is also of great practical importance.

Furthermore, it turns out that the gypsum boards obtained show good bonding between the gypsum and the external sheet. This is due in particular to the structure of the bubbles obtained with the surfactant composition according to the invention.

Furthermore, the surfactant composition for the gypsum composition according to the invention comprises alkyl sulfates of formula $H(CH_2)_nOSO_3^-M^+$, in which n is from 6 to 16, the mean number of carbon atoms in the alkyl sulfate composition $n_m$ being between 10 and 11, and M is a monovalent cation.

Such a composition can easily be obtained by simple addition of a $C_{12}$ alkyl sulfate, such as Texapon K12-98, available from Cognis, or Emal E 30, available from Kao Corporation SA, to a mixture of $C_8$ and $C_{10}$ alkyl sulfates (such as, for example, Emal A10 DE, sold by Kao Corporation SA).

The alkyl sulfates corresponding to the formula $H(CH_2)_n$—$OSO_3M$ are generally obtained by sulfatation of the corresponding alcohols. In principle, n is generally an even number because of the better availability of these alcohols. However, alkyl sulfates with n uneven can also be used in the context of the invention.

The chain of the alkyl sulfates participating in the composition preferably comprises from 8 to 12 carbon atoms.

The surfactant composition can additionally include a hydrotropic agent. Such hydrotropic agents are, for example, methanol, ethanol, isopropanol, ethylene glycol, propylene glycol, polyethylene glycol and polypropylene glycol, as well as ethylene glycol monoalkyl ethers, alkyl polyglycosides and mixtures thereof.

The composition can advantageously comprise a sequestering or chelating agent which makes it possible to keep in solution magnesium or calcium ions, in particular in hard water. Such sequestering or chelating agents are, for example, hydroxycarboxylic acids and their salts, aldoses and ketoses, inorganic complexing agents, more particularly phosphates, borates and polyphosphates, organic complexing agents chosen more particularly from the group consisting of EDTA, NTA, and the like, and phosphoric acid derivatives with a polymer structure which comprise hydroxyl and/or amine and/or carboxylate groups.

The foam obtained makes it possible to introduce, into the gypsum board, from 0.01 to 0.04% by weight of surfactant (expressed on a dry basis) with respect to the weight of the board. It represents a volume of between 20 and 40% of that of the gypsum board.

The foamed gypsum board can moreover advantageously comprise admixtures which are conventionally used, such as fluidizers, plasticizers, accelerators, starch, and the like.

The invention will be better understood from the viewpoint of the following examples, which are given by way of illustration and without implied limitation.

EXAMPLES

Example 1

Miniboards with an area of 0.1 m² and with a thickness of 12.5 mm are prepared with gypsum from St Loubes, which is a gypsum obtained by flash calcination of a natural gypsum having the following characteristics
  gypsum content: 68.8%
  anhydrite: 0.90%
  magnesia: 3.70%
  dolomite: 8.80%
  talc: 0.80%
  phlogopite: 1.10%
  microline: 3.80%
  quartz: 9.50%
  celestine: 0.60%
  clinochlore: 2.00%.

These boards are prepared in the following way:
foam is prepared by stirring, for 1 minute in a foam generator of the Hamilton Beach type set to a voltage of 55 volts, a mixture of 5.25 ml of a 50 g/l solution of a composition composed of sodium alkyl sulfates comprising 7.7% by weight of $C_8$ alkyl, 73.1% by weight of $C_{10}$ alkyl and 19.2% by weight of $C_{12}$ alkyl, the mean carbon number, taking into account the molar mass of the components, being 10.23, with 170 ml of water at 22° C. The foam is subsequently introduced into a mixture of 700 g of water at a temperature of 50° C. and 1130 g of gypsum at a temperature of 22° C. The gypsum slurry is deposited between two sheets of cardboard. The excess after filling is removed. The miniboard is subsequently dried in an oven at a steadily increasing temperature of from 100° C. to 200° C. over 15 min, and then a steadily decreasing temperature from 200° C. to 900° over 25 min.

Example 2

Gypsum boards are manufactured according to Example 1 but replacing the surfactant composition with the same amount of a surfactant comprising 84.2% by weight of $C_{10}$ alkyl sulfate and 15.8% by weight of $C_{12}$ alkyl sulfate. The mean number of carbon atoms $n_m$ in the composition is 10.32.

Example 3

Gypsum boards are manufactured according to Example 1 but replacing the surfactant composition with the same amount of a surfactant comprising 95% by weight of $C_{10}$ alkyl sulfate and 5% by weight of $C_{12}$ alkyl sulfate. The mean number of carbon atoms in the composition $n_m$ is 10.10.

Example 4

Gypsum boards are manufactured according to Example 1 but replacing the surfactant composition with the same amount of a surfactant comprising 5.5% by weight of $C_8$ alkyl sulfate, 83.5% by weight of $C_{10}$ alkyl sulfate and 11% by weight of $C_{12}$ alkyl sulfate. The mean number of carbon atoms in the composition $n_m$ is 10.10.

Example 5

Gypsum boards are manufactured according to Example 1 but replacing the surfactant composition by the same amount of a surfactant comprising an alkyl sulfate (AS) and an alkyl ether sulfate (AES). This surfactant is sold by Cognis under the name F1919.

Example 6

Gypsum boards are manufactured according to Example 1 but replacing the surfactant composition with the same amount of a surfactant comprising an alkyl sulfate (AS) and an alkyl ether sulfate (AES). This surfactant is sold by Stepan under the name alphafoamer.

The foaming power of the surfactant compositions is evaluated with regard to the foam volume which they are capable of forming for a given concentration. For this, 5.5 ml of a 50 g/l solution of the surfactant composition are mixed with 170 ml of water. The solution obtained is stirred in a Hamilton Beach mixer set at 6000 rev/min for 1 minute. The foam volume formed is immediately measured. The results are recorded in Table 1 below.

The boards prepared according to the examples, once dried to constant weight in agreement with French Standard 72–302, are weighed and their weights per m2 are determined. The results are recorded in Table 1 below.

TABLE 1

| Example | $n_m$ | Foam volume [ml] | Unit weight [kg/m²] |
|---|---|---|---|
| 1 | 10.23 | 760 | 8.31 |
| 2 | 10.32 | 710 | 8.43 |
| 3 | 10.1 | 690 | 8.78 |
| 4 | 10.1 | 730 | 8.56 |
| 5* | AS + AES | 755 | 8.44 |
| 6* | AS + AES | 750 | 8.75 |

*Comparative examples

The compositions according to the invention make it possible, without excess consumption in comparison with mixtures of alkyl sulfates and of alkyl ether sulfates, to obtain comparable foam volumes. The foam obtained is stable and results in a reduction in weight of the gypsum boards which is identical to or greater than that obtained according to the prior art. Example 1 illustrates a preferred implementation of a surfactant composition according to the invention. Examples 4 and 3 additionally demonstrate that these performances can be exceeded by a ternary combination of alkyl sulfates with the same given $n_m$ in comparison with a binary combination. This is because not only does the ternary composition generate a larger amount of foam but it also turns out that the said ternary composition makes it possible to obtain a board with a lower density than that of the board obtained from the binary composition with the same $n_m$.

The compositions X, Y and Z correspond to the following mixtures of alkyl sulfates (by weight):
X: 25% $C_{8-75}$% $C_{10}$
Y: 50% $C_{8-50}$% $C_{10}$
Z: 75% $C_{8-25}$% $C_{10}$ They make it possible to demonstrate that when $n_m$ is less than 10, for an identical dosage to that of the examples in Table 1, the foam volume generated is not adequate. This is subsequently reflected by the fact that the foam obtained does not make it possible to achieve a sufficient level of weight reduction in the boards. At an equivalent foam volume (composition X compared with Example 3), the inadequate reduction in weight demonstrates the unstability of the foam obtained. This emerges from the test results displayed in Table 2.

TABLE 2

| Example | $n_m$ | Foam volume [ml] | Unit weight [kg/m²] |
|---|---|---|---|
| X | 9.35 | 690 | 9.06 |
| Y | 9 | 635 | 9.13 |
| Z | 8.5 | 680 | 9.86 |

To evaluate the mechanical properties of the boards, the compressive strength is measured from a 5×5 cm² sample withdrawn from the board. The ballprint and the load at failure of the core (three-point bending test) are measured according to NF Standard P 72–302.

The hardness of the core is measured according to ASTM Standard C473, Method B. Rc is the ratio of compressive strength to weight per m² of the board. For two boards of the same thickness, the ration Rc makes it possible to compare the compressive strength of boards having not exactly the same weight. It demonstrates the improvement made by the surfactant compositions to the mechanical strength characteristic.

All the characteristics of the gypsum boards obtained by virtue of the compositions according to the invention are superior to or the same as those of the gypsum boards obtained by virtue of the compositions of the prior art.

Thus, at an adequate mechanical performance, the preferred implementation corresponds to that which results in the maximum reduction in weight. This is Example 1 (composition corresponding to an $n_m$ of 10.23) which corresponds to the preferred implementation.

The results of these measurements are recorded in Table 3 below.

TABLE 3

| Example | $n_m$ | Compressive strength [MPa] | ballprint [mm] | Core hardness [DaN] | Nail pull [DaN] | Rc [Mpa m²/kg] |
|---|---|---|---|---|---|---|
| 1 | 10.23 | 2.99 | 19.3 | 8.6 | 32.9 | 0.35 |
| 2 | 10.32 | 3.06 | 19.0 | 7.8 | 32.4 | 0.36 |
| 3 | 10.1 | 3.34 | 18.9 | 9.8 | 34.6 | 0.38 |
| 4 | 10.1 | 3.36 | 18.9 | 9.4 | 33.6 | 0.39 |
| 5* | AS + AES | 2.33 | 20.0 | 6.9 | 30.2 | 0.27 |
| 6* | AS + AES | 2.59 | 19.8 | 7.6 | 32.6 | 0.29 |

*Comparative examples

Furthermore, the gypsum boards prepared were characterized by the measurement of the bonding between cardboard and the core. The measurement consists in tearing the cardboard off the board and evaluating the percentage of peel of the cardboard from the core. The dry bonding test is carried out on a dry board. The wet bonding test after 2 hours is carried out after rehumidification for 2 hours at 30° C. in a controlled atmosphere at 90% humidity. The results are recorded in Table 4 below.

TABLE 4

| Example | Dry bonding [% peel] | Wet bonding after 2 hours [% peel] |
|---|---|---|
| 1 | 0 | 5 |
| 2 | 0 | 3 |
| 3 | 0 | 3 |
| 4 | 0 | 3 |
| 5* | 12 | 100 |
| 6* | 3 | 30 |

*Comparative examples

The results demonstrate the superiority of the compositions according to the invention with regard to the bonding, whether dry bonding or wet bonding after 2 hours, in particular with regard to surfactant comprising alkylethersulfates.

The invention claimed is:

1. A gypsum composition comprising, in combination with gypsum and water, a surfactant composition comprising alkyl sulfates of formula $H(CH_2)_n OSO_3^- M^+$,
   in which n is from 6 to 16, the mean number of carbon atoms in the alkyl sulfate composition $n_m$ being between 10 and 11, and M is a monovalent cation
   wherein the surfactant composition is free from alkyl ether sulfates.

2. The composition according to claim 1, in which $n_m$ of the surfactant composition is between 10.1 and 10.7.

3. The composition according to claim 1, in which the surfactant composition comprises 0 to 30% by weight of octyl sulfate.

4. The composition according to claim 1, in which M is chosen from sodium and ammonium.

5. A gypsum board obtained from a gypsum composition according to claim 1.

6. A gypsum composition comprising, in combination with gypsum and water, a surfactant composition comprising alkyl sulfates of formula $H(CH_2)_n OSO_3^- M^+$,
   in which n is from 6 to 16, the mean number of carbon atoms in the alkyl sulfate composition $n_m$ being between 10 and 11, and M is a monovalent cation,
   in which the surfactant composition comprises three alkyl sulfates.

7. A gypsum board obtained from a gypsum composition according to claim 6.

8. A gypsum composition comprising, in combination with gypsum and water, a surfactant composition comprising alkyl sulfates of formula $H(CH_2)_n OSO_3^- M^+$,
   in which n is from 6 to 16, the mean number of carbon atoms in the alkyl sulfate composition $n_m$ being between 10 and 11, and M is a monovalent cation,
   in which the surfactant composition comprises 40 to 90% by weight of decyl sulfate.

9. A gypsum board obtained from a gypsum composition according to claim 8.

10. A gypsum composition comprising, in combination with gypsum and water, a surfactant composition comprising alkyl sulfates of formula $H(CH_2)_n OSO_3^- M^+$,
    in which n is from 6 to 16, the mean number of carbon atoms in the alkyl sulfate composition $n_m$ being between 10 and 11, and M is a monovalent cation,
    in which the surfactant composition comprises 10 to 50% by weight of dodecyl sulfate.

11. A gypsum board obtained from a gypsum composition according to claim 10.

12. A gypsum composition comprising, in combination with gypsum and water, a surfactant composition comprising alkyl sulfates of formula $H(CH_2)_n OSO_3^- M^+$,
    in which n is from 6 to 16, the mean number of carbon atoms in the alkyl sulfate composition $n_m$ being between 10 and 11, and M is a monovalent cation,
    in which the surfactant composition comprises 55 to 75% by weight of sodium decyl sulfate, 0 to 15% by weight of sodium octyl sulfate and 18 to 37% by weight of sodium dodecyl sulfate.

13. A gypsum board obtained from a gypsum composition according to claim 12.

14. A gypsum composition comprising, in combination with gypsum and water, a surfactant composition comprising alkyl sulfates of formula $H(CH_2)_n OSO_3^- M^+$,
    in which n is from 6 to 16, the mean number of carbon atoms in the alkyl sulfate composition $n_m$ being between 10 and 11, and M is a monovalent cation,
    in which the surfactant composition additionally comprises a sequestering agent.

15. The composition according to claim 14, in which the sequestering agent is selected from the group consisting of hydroxycarboxylic acids and their salts, aldoses and ketoses, phosphates, borates and polyphosphates, EDTA, NTA, and phosphoric acid derivatives with a polymer structure which comprise at least hydroxyl, amine, or carboxylate groups.

16. A gypsum board obtained from a gypsum composition according to claim 14.

17. A gypsum composition comprising, in combination with gypsum and water, a surfactant composition comprising alkyl sulfates of formula $H(CH_2)_n OSO_3^- M^+$,
    in which n is from 6 to 16, the mean number of carbon atoms in the alkyl sulfate composition $n_m$ being between 10 and 11, and M is a monovalent cation,
    in which the surfactant composition additionally comprises a hydrotropic agent.

18. A gypsum board obtained from a gypsum composition according to claim 17.

19. A process for the manufacture of a gypsum composition, the process comprising:
    preparing a gypsum slurry from gypsum and water;
    forming a foam from a surfactant composition comprising alkyl sulfates of the formula $H(CH_2)_n OSO_3^- M^+$,
    in which n is a number between 6 and 16, the mean number of carbon atoms in the alkyl sulfate composition $n_m$ being between 10 and 11, and M is a monovalent cation, and water,
    wherein the surfactant composition is free from alkyl ether sulfates; and
    mixing the gypsum slurry and the surfactant foam.

20. The process according to claim 19, in which $n_m$ of the surfactant composition is between 10.1 and 10.7.

21. The process according to claim 19, in which the surfactant composition comprises 0 to 30% by weight of octyl sulfate.

22. The process according to claim 19, in which M is chosen from sodium and ammonium.

23. A process for the manufacture of a gypsum composition, the process comprising:
    preparing a gypsum slurry from gypsum and water;
    forming a foam from a surfactant composition comprising alkyl sulfates of the formula $H(CH_2)_n OSO_3^- M^+$, in which n is a number between 6 and 16, the mean number of carbon atoms in the alkyl sulfate composition $n_m$ being between 10 and 11, and M is a monovalent cation, and water, and in which the surfactant composition comprises three alkyl sulfates; and mixing the gypsum slurry and the surfactant foam.

24. A process for the manufacture of a gypsum composition, the process comprising:

preparing a gypsum slurry from gypsum and water;

forming a foam from a surfactant composition comprising alkyl sulfates of the formula $H(CH_2)_nOSO_3^-M^+$, in which n is a number between 6 and 16, the mean number of carbon atoms in the alkyl sulfate composition $n_m$ being between 10 and 11, and M is a monovalent cation, and water, and in which the surfactant composition comprises 40 to 90% by weight of decyl sulfate; and mixing the gypsum slurry and the surfactant foam.

25. A process for the manufacture of a gypsum composition, the process comprising:

preparing a gypsum slurry from gypsum and water;

forming a foam from a surfactant composition comprising alkyl sulfates of the formula $H(CH_2)_nOSO_3^-M^+$, in which n is a number between 6 and 16, the mean number of carbon atoms in the alkyl sulfate composition $n_m$ being between 10 and 11, and M is a monovalent cation, and water, and in which the surfactant composition comprises 10 to 50% by weight of dodecyl sulfate; and mixing the gypsum slurry and the surfactant foam.

26. A process for the manufacture of a gypsum composition, the process comprising:

preparing a gypsum slurry from gypsum and water;

forming a foam from a surfactant composition comprising alkyl sulfates of the formula $H(CH_2)_nOSO_3^-M^+$, in which n is a number between 6 and 16, the mean number of carbon atoms in the alkyl sulfate composition $n_m$ being between 10 and 11, and M is a monovalent cation, and water, and in which the surfactant composition comprises 55 to 75% by weight of sodium decyl sulfate, 0 to 15% by weight of sodium octyl sulfate and 18 to 37% by weight of sodium dodecyl sulfate; and mixing the gypsum slurry and the surfactant foam.

27. A process for the manufacture of gypsum boards, comprising the stages of:

preparing a gypsum slurry from gypsum and water;

forming a foam from a surfactant composition comprising alkyl sulfates of formula $H(CH_2)_nOSO_3^-M^+$, in which n is a number between 6 and 16, the mean number of carbon atoms in the alkyl sulfate composition $n_m$ being between 10 and 11, and M is a monovalent cation, and water, wherein the surfactant composition is free from alkyl ether sulfates; and mixing the gypsum slurry and the surfactant foam;

pouring the gypsum composition between two layers of external material;

drying the gypsum board.

28. The process according to claim 27, in which $n_m$ of the surfactant composition is between 10.1 and 10.7.

29. The process according to claim 27, in which the surfactant composition comprises 0 to 30% by weight of octyl sulfate.

30. The process according to claim 27, in which M is chosen from sodium and ammonium.

31. A process for the manufacture of gypsum boards, comprising the stages of:

preparing a gypsum slurry from gypsum and water;

forming a foam from a surfactant composition comprising alkyl sulfates of formula $H(CH_2)_nOSO_3^-M^+$, in which n is a number between 6 and 16, the mean number of carbon atoms in the alkyl sulfate composition $n_m$ being between 10 and 11, and M is a monovalent cation, and water, and in which the surfactant composition comprises three alkyl sulfates; and mixing the gypsum slurry and the surfactant foam;

pouring the gypsum composition between two layers of external material;

drying the gypsum board.

32. A process for the manufacture of gypsum boards, comprising the stages of:

preparing a gypsum slurry from gypsum and water;

forming a foam from a surfactant composition comprising alkyl sulfates of formula $H(CH_2)_nOSO_3^-M^+$, in which n is a number between 6 and 16, the mean number of carbon atoms in the alkyl sulfate composition $n_m$ being between 10 and 11, and M is a monovalent cation, and water, and in which the surfactant composition comprises 40 to 90% by weight of decyl sulfate; and mixing the gypsum slurry and the surfactant foam;

pouring the gypsum composition between two layers of external material;

drying the gypsum board.

33. A process for the manufacture of gypsum boards, comprising the stages of:

preparing a gypsum slurry from gypsum and water;

forming a foam from a surfactant composition comprising alkyl sulfates of formula $H(CH_2)_nOSO_3^-M^+$, in which n is a number between 6 and 16, the mean number of carbon atoms in the alkyl sulfate composition $n_m$ being between 10 and 11, and M is a monovalent cation, and water, and in which the surfactant composition comprises 10 to 50% by weight of dodecyl sulfate; and mixing the gypsum slurry and the surfactant foam;

pouring the gypsum composition between two layers of external material;

drying the gypsum board.

34. A process for the manufacture of gypsum boards, comprising the stages of:

preparing a gypsum slurry from gypsum and water;

forming a foam from a surfactant composition comprising alkyl sulfates of formula $H(CH_2)_nOSO_3^-M^+$, in which n is a number between 6 and 16, the mean number of carbon atoms in the alkyl sulfate composition $n_m$ being between 10.1 and 10.7, and M is a monovalent cation, and water; and in which the surfactant composition comprises 40 to 90% by weight of decyl sulfate, 0 to 30% by weight of octyl sulfate, and 10 to 50% by weight of dodecyl sulfate; and mixing the gypsum slurry and the surfactant foam;

pouring the gypsum composition between two layers of external material;

drying the gypsum board.

35. The process according to claim 34, in which M is chosen from sodium and ammonium.

36. The process according to claim 34, in which the surfactant composition comprises 55 to 75% by weight of sodium decyl sulfate, 0 to 15% by weight of sodium octyl sulfate and 18 to 37% by weight of sodium dodecyl sulfate.

37. A process for the manufacture of a gypsum composition, the process comprising:
preparing a gypsum slurry from gypsum and water;
forming a foam from a surfactant composition comprising alkyl sulfates of the formula $H(CH_2)_nOSO_3^-M^+$,
in which n is a number between 6 and 16, the mean number of carbon atoms in the alkyl sulfate composition $n_m$ being between 10 and 11, and M is a monovalent cation, and water, and in which the surfactant composition additionally comprises a sequestering agent; and
mixing the gypsum slurry and the surfactant foam.

38. The process according to claim 37, in which the sequestering agent is selected from the group consisting of hydroxycarboxylic acids and their salts, aldoses and ketoses, phosphates, borates and polyphosphates, EDTA, NTA, and phosphoric acid derivatives with a polymer structure which comprise at least hydroxyl, amine, or carboxylate groups.

39. A process for the manufacture of a gypsum composition, the process comprising:
preparing a gypsum slurry from gypsum and water;
forming a foam from a surfactant composition comprising alkyl sulfates of the formula $H(CH_2)_nOSO_3^-M^+$,
in which n is a number between 6 and 16, the mean number of carbon atoms in the alkyl sulfate composition $n_m$ being between 10 and 11, and M is a monovalent cation, and water, and in which the surfactant composition additionally comprises a hydrotropic agent; and
mixing the gypsum slurry and the surfactant foam.

40. A process for the manufacture of gypsum boards, comprising the stages of:
preparing a gypsum slurry from gypsum and water;
forming a foam from a surfactant composition comprising alkyl sulfates of formula $H(CH_2)_nOSO_3^-M^+$,
in which n is a number between 6 and 16, the mean number of carbon atoms in the alkyl sulfate composition rim being between 10 and 11, and M is a monovalent cation, and water, and in which the surfactant composition additionally comprises a sequestering agent; and
mixing the gypsum slurry and the surfactant foam;
pouring the gypsum composition between two layers of external material;
drying the gypsum board.

41. The process according to claim 40, in which the sequestering agent is selected from the group consisting of hydroxycarboxylic acids and their salts, aldoses and ketoses, phosphates, borates and polyphosphates, EDTA, NTA, and phosphoric acid derivatives with a polymer structure which comprise at least hydroxyl, amine, or carboxylate groups.

42. A process for the manufacture of gypsum boards, comprising the stages of:
preparing a gypsum slurry from gypsum and water;
forming a foam from a surfactant composition comprising alkyl sulfates of formula $H(CH_2)_nOSO_3^-M^+$,
in which n is a number between 6 and 16, the mean number of carbon atoms in the alkyl sulfate composition $n_m$ being between 10 and 11, and M is a monovalent cation, and water, and in which the surfactant composition additionally comprises a hydrotropic agent; and
mixing the gypsum slurry and the surfactant foam;
pouring the gypsum composition between two layers of external material;
drying the gypsum board.

43. A gypsum composition comprising, in combination with gypsum and water, a surfactant composition comprising alkyl sulfates of formula $H(CH_2)_nOSO_3^-M^+$,
in which n is from 6 to 16, the mean number of carbon atoms in the alkyl sulfate composition $n_m$ being between 10 and 11, and M is a monovalent cation.

44. The composition according to claim 43, in which $n_m$ of the surfactant composition is between 10.1 and 10.7.

45. The composition according to claim 43, in which the surfactant composition comprises three alkyl sulfates.

46. The composition according to claim 43, in which the surfactant composition comprises 40 to 90% by weight of decyl sulfate.

47. The composition according to claim 43, in which the surfactant composition comprises 0 to 30% by weight of octyl sulfate.

48. The composition according to claim 43, in which the surfactant composition comprises 10 to 50% by weight of dodecyl sulfate.

49. The composition according to claim 43, in which M is chosen from sodium and ammonium.

50. The composition according to claim 43, in which the surfactant composition comprises 55 to 75% by weight of sodium decyl sulfate, 0 to 15% by weight of sodium octyl sulfate and 18 to 37% by weight of sodium dodecyl sulfate.

51. The composition according to claim 43, in which the surfactant composition additionally comprises a sequestering agent.

52. The composition according to claim 43, in which the surfactant composition additionally comprises a hydrotropic agent.

53. A process for the manufacture of a gypsum composition comprising the stages of:
preparing a gypsum slurry from gypsum and water;
forming a foam from a surfactant composition comprising alkyl sulfates of the formula $H(CH_2)_nOSO_3^-M^+$,
in which n is a number between 6 and 16, the mean number of carbon atoms in the alkyl sulfate composition $n_m$ being between 10 and 11, and M is a monovalent cation, and water; and
mixing the gypsum slurry and the surfactant foam.

54. The process according to claim 53, in which $n_m$ of the surfactant composition is between 10.1 and 10.7.

55. The process according to claim 53, in which the surfactant composition comprises three alkyl sulfates.

56. The process according to claim 53, in which the surfactant composition comprises 40 to 90% by weight of decyl sulfate.

57. The process according to claim 53, in which the surfactant composition comprises 0 to 30% by weight of octyl sulfate.

58. The process according to claim 53, in which the surfactant composition comprises 10 to 50% by weight of dodecyl sulfate.

59. The process according to claim 53, in which M is chosen from sodium and ammonium.

60. The process according to claim 53, in which the surfactant composition comprises 55 to 75% by weight of sodium decyl sulfate, 0 to 15% by weight of sodium octyl sulfate and 18 to 37% by weight of sodium dodecyl sulfate.

61. The process according to claim 53, in which the surfactant composition additionally comprises a sequestering agent.

62. The process according to claim 53, in which the surfactant composition additionally comprises a hydrotropic agent.

63. A process for the manufacture of gypsum boards, comprising the stages of:
preparing a gypsum slurry from gypsum and water;
forming a foam from a surfactant composition comprising alkyl sulfates of formula $H(CH_2)_n OSO_3^- M^+$,
in which n is a number between 6 and 16, the mean number of carbon atoms in the alkyl sulfate composition $n_m$ being between 10 and 11, and M is a monovalent cation, and water; and
mixing the gypsum slurry and the surfactant foam;
pouring the gypsum composition between two layers of external material;
drying the gypsum board.

64. A gypsum composition comprising, in combination with gypsum and water, a surfactant composition comprising alkyl sulfates of formula $H(CH_2)_n OSO_3^- M^+$,
in which n is from 6 to 16, the mean number of carbon atoms in the alkyl sulfate composition $n_m$ being between 10.1 and 10.7 and M is a monovalent cation.

65. The composition according to claim 64, in which the surfactant composition comprises three alkyl sulfates.

66. The composition according to claim 64, in which the surfactant composition comprises 40 to 90% by weight of decyl sulfate.

67. The composition according to claim 64, in which the surfactant composition comprises 0 to 30% by weight of octyl sulfate.

68. The composition according to claim 64, in which the surfactant composition comprises 10 to 50% by weight of dodecyl sulfate.

69. The composition according to claim 64, in which M is chosen from sodium and ammonium.

70. The composition according to claim 64, in which the surfactant composition comprises 55 to 75% by weight of sodium decyl sulfate, 0 to 15% by weight of sodium octyl sulfate and 18 to 37% by weight of sodium dodecyl sulfate.

71. The composition according to claim 64, in which the surfactant composition additionally comprises a sequestering agent.

72. The composition according to claim 64, in which the surfactant composition additionally comprises a hydrotropic agent.

* * * * *